United States Patent [19]
Owen

[11] 3,751,098
[45] Aug. 7, 1973

[54] CONTAINER CARRIER
[75] Inventor: Ronald C. Owen, Harwood Heights, Ill.
[73] Assignee: Illinois Tool Work Inc., Chicago, Ill.
[22] Filed: Nov. 17, 1971
[21] Appl. No.: 199,606

[52] U.S. Cl............... 294/87.2, 206/65 C, 220/23.4
[51] Int. Cl............................................. B65d 21/02
[58] Field of Search................. 294/87.2; 206/65 R, 206/65 C, 65 CT; 220/23.4, 102; 224/45 AA

[56] References Cited
UNITED STATES PATENTS
D199,284  9/1967  Petrone et al...................... D9/178
3,630,350  12/1971  Bolton ........................... 294/87.2 X Primary Examiner—Evon C. Blunk
Assistant Examiner—Johnny D. Cherry
Attorney—R. W. Beart and E. L. Benno

[57] ABSTRACT

A molded plastic carrier for a pair of containers such as cans in which the sides of the carrier include male and female snap means so that two or more carriers may be joined together to provide a unitary package of a selected number of carriers for storing and transporting a selected number of pairs of containers and further may be conveniently manually separated or rejoined.

3 Claims, 5 Drawing Figures

PATENTED AUG 7 1973　　3,751,098
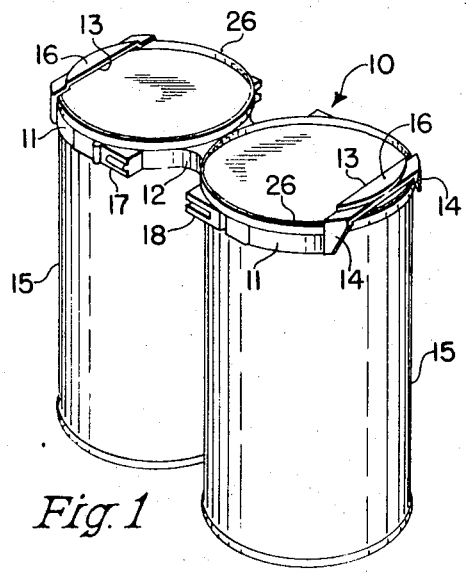
Fig. 1
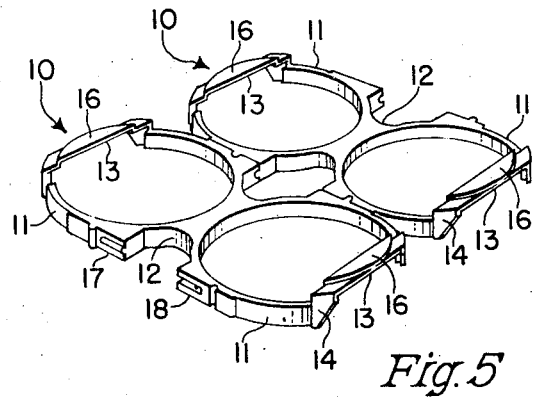
Fig. 5
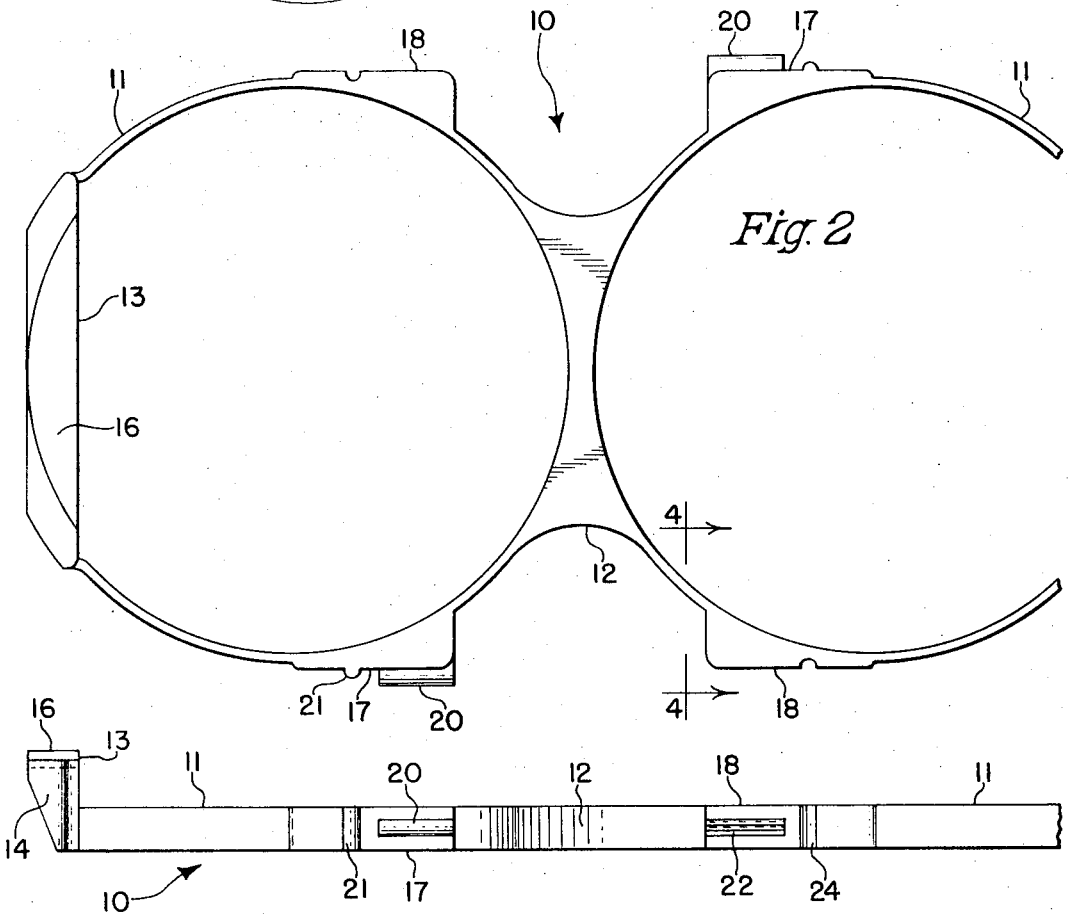
Fig. 2
Fig. 3
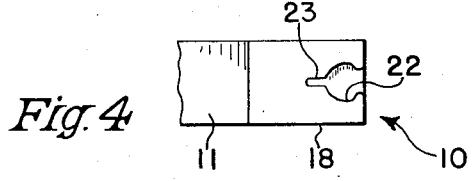
Fig. 4

CONTAINER CARRIER

BACKGROUND OF THE INVENTION

The invention is intended for use in the field of multi-packaging of containers and is particularly directed toward carriers which may easily be applied by machine or hand to containers such as cans having a chime at the uper end of the cans. U.S. Pat. No. 3,331,500 in FIG. 7 thereof, and U.S. Design Pat. No. 199,284 show carriers of the type that can be relatively easily manually applied to cans. However, those carriers are generally made for a predetermined relatively large number of cans.

SUMMARY OF THE IVNENTION

The present invention contemplates a basic machine or hand applied carrier for a pair of cans. The carrier further includes certain cooperative fastener means on the sides thereof which may be alternatively machine or hand joined so that any selected number of carriers can be connected together for storing or tranaporting any selected number of pairs of cans as a unitary package and so that the unitary package may be easily manually separated into sub-packages. Multiples of the carrier of the ivnention may be first machine or manually applied to the cans and then machine or manually snapped together, or in the alternative, may be first machine or manually joined together and then machine or manually applied to the cans. The invention contemplates that separation of the carriers and removal of the cans be done manually.

When the carrier is used for transporting a pair of cans, the web between the carrier encircling bands provides convenient finger gripping means. When the carrier is used in multiples of two or more for transporting more than a single pair of cans, convenient finger holes or holds are defined and provided by the cooperating of adjacent web portions of adjacent carriers.

The primary object of the invention is to provide an easily machine or manually applied carrier for a pair of containers having upper chimes and which further has an arrangement for easily machine or manually joining together a plurality of carriers whereby to provide a convenient compact unitary package for storing or transporting a plurality of pairs of cans with the arrangement further permitting easy manual separation of a package of carriers and cans.

Other objects and features of the invention will be apparent upon a perusal of the hereinafter following specification and drawings.

BRIEF DESCRIPTION OF THE DRAWINGS

FIG. 1 is a perspective view of a carrier constructed according to the invention and applied to a pair of cans;

FIG. 2 is an enlarged top plan view of a carrier constructed according to the invention;

FIG. 3 is a side elevational view of the structure shown in FIG. 2;

FIG. 4 is an enlarged fragmentary view of a portion of a structure shown in FIG. 2 and taken substantially along the line 4—4 of FIG. 2; and FIG. 5 is a perspective view of two carriers constructed according to the invention and snapped together to provide a carrier for four containers.

DETAILED DESCRIPTION OF THE PREFERRED EMBODIMENT

In the preferred embodiment, the carrier 10 is molded from a resilient, deformable plastic material such as linear polyethylene. By virtue of the hereinafter defined configuraiton of the carrier, a slight flexing of the parts of the carrier is desirable and necessary to permit a person to easily apply the carrier to a pair of cans, and either before or after application, to join multiples of the carriers together. The contemplated molded linear polyethylene material permits such slight flexing. The material and particular configuration of the carrier also provides a carrier that will firmly hold the cans, and will positively join a plurality of carriers, under all normal conditions encountered by a person in the storing, stacking or transporting of the manually assembled package.

As may be seen in FIG. 1, the carrier 10 comprises two container encircling bands 11 integrally joined by a web 12. The bands 11 are discontinuous at the circumferential portions opposite from the portions joined by the web 12. The circumferentially discontinuous portions of the bands 11 are each joined to a chordal member 13. The ends of the chordal member 13 are formed to have depending members 14 which position the chordal members 13 above the bands 11.

The carrier 10 is manually applied to containers such as cans 15 by positioning the chimes 26 of the cans 15 through and immediately above bands 11, and the chordal members 13 are then manually snapped downward to secure the cans 15 within the carrier 10.

The web 12 is molded between the convex curves of the bands 11 and defines spaced apart concave edges providing a convenient finger gripping portion for manually transporting the carrier and any cans 15 retained therein.

Each of the chordal members 13 further includes a raised area 16 having the shape of a segment of a circle. The areas 16 are provided so that when a second pair of cans having bottom chimes is placed upon a first pair, the areas 16 of the first or lower pair will nest within the lower chimes of the second or upper pair to prevent the upper pair from sliding off the lower pair.

The carrier 10 further comprises integrally molded snap means 17 and 18. The snap means 17 and 18 are generally triangularly shaped and are positioned on the bands 11 to lie substantially on a tangent line drawn between the side edges of the bands 11 and within the area defined by the tangent line and the bands 11.

Each band 11 includes one snap means 17 and one snap means 18 oppositely positioned from the respective snap means on the other band 11.

Each snap means 17 is a male snap member and comprises a substantially rod shaped tongue 20 extending substantially along the tangent line to the pair of bands 11. Each male snap member further comprises a boss or projection 21 which extends perpendicular to the axis of the tongue 20.

Each of the snap means 18 is a female snap member and comprises a cylindrically shaped slot 22 longitudinally extending substantially along the tangent line between the two bands 11. The slot 22 is shaped to receive a tongue 20 in a firm interlocking relationship. Each female snap member 18 further includes a second slot 23 extending longitudinally of the slot 22 and along the inner wall thereof as may be seen in FIG. 4. The slot 23 permits the female snap member 18 to flex sufficiently to easily receive the tongue 20 of a male snap member 17. Each female snap member 18 further includes a recess 24 which extends substantially perpendicular to the axis of the slot 22. The recess 24 is shaped to receive the projection or boss 21 of the male snap member 17.

From the foregoing it may be seen that two or more carriers 10 may be arranged in a side-by-side alignment and manually pushed together. The male and female snap means 17 and 18 will cooperate in a snapping action to interlock the carriers 10 as a unitary carrier assembly such as shown in FIG. 5. By virtue of the described construction, two or more carriers 10 may be easily separated by a slight manual upward pivoting or tilting of one carrier relative to the adjacent joined carrier. Once separated, the carriers 10 may further be rejoined by manually pushing the carriers together.

Having described the invention, it is to be understood that changes can be made in the described embodiment by one skilled in the art within the spirit and scope of the invention as defined in the claims.

I claim:

1. A molded plastic carrier for a pair of containers having upper chimes comprising, a pair of integrally molded circumferentially discontinuous container encircling bands of a diameter permitting each of said bands to be mounted about a container immediately below the upper chime thereof, the circumferentially discontinuous portions of said bands being diametrically arranged, chordal members integrally molded across and above said circumferentially discontinuous portions of said bands to superimpose the tops of said containers, integrally molded fastener means on opposite sides of each of said bands for joining a plurality of said containers together to form a package of a plurality of pairs of containers, said fastener means comprising integrally molded male and female snap means, said male and female snap means formed on the opposite sides of said pair of bands substantially within the areas defined by the bands and common tangents to said pair of bands, one of said bands of said pair of bands having one of said male snap means on one side thereof and one of said female snap means on the other side thereof, the other band of said pair of bands having one of said male snap means on the same side thereof as the female snap means of said one of said bands and one of said female snap means on the other side thereof, each of said male snap means comprising a substantially rod-shaped tongue longitudinally extending substantially along the common tangent lines to the pair of bands, and each of said female snap means comprising a slot cylindrically shaped to receive said tongue of an adjacent identical carrier in an interlocking relationship.

2. A carrier as defined in claim 1, a second slot formed in the inner wall of each said slots and lying substantially in a plane perpendicular to the axes of said bands, said second slots being formed to have a depth sufficient to permit flexing of the walls of said slots to receive said tongue in a manual snapping together of a plurality of said carriers.

3. A carrier as defined in claim 1, each of said male snap means further including a boss formed on said band and axially spaced from said tongue, and each of said female snap means further including a recess complementarily shaped to said bosses and positioned on said bands to cooperatively receive the respective boss therein.

* * * * *